Figures 1, 2:
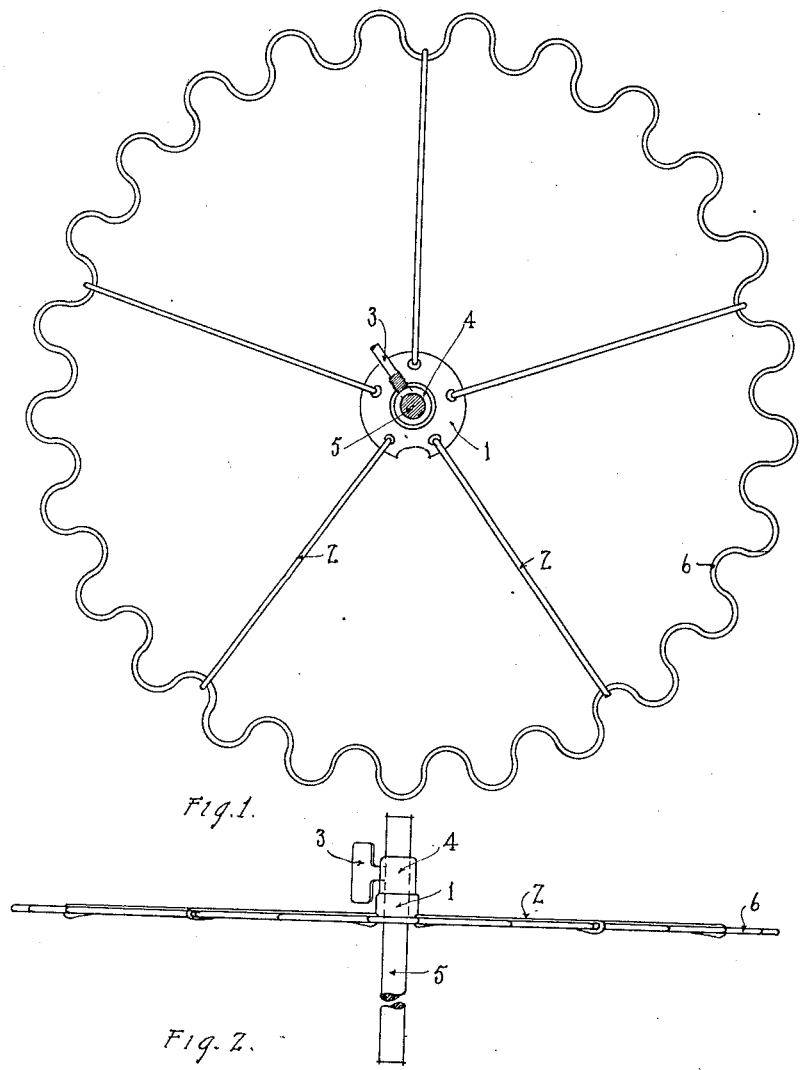

H. THOENI.
TREE SUPPORT.
APPLICATION FILED SEPT. 9, 1912.

1,084,240.

Patented Jan. 13, 1914.

WITNESSES

INVENTOR
Herman Thoeni
BY
ATTORNEY

UNITED STATES PATENT OFFICE.

HERMAN THOENI, OF SPOKANE, WASHINGTON.

TREE-SUPPORT.

1,084,240. Specification of Letters Patent. Patented Jan. 13, 1914.

Application filed September 9, 1912. Serial No. 719,371.

*To all whom it may concern:*

Be it known that I, HERMAN THOENI, a citizen of the Republic of Switzerland, and a resident of the city of Spokane, county of Spokane, State of Washington, have invented a new and useful device or appliance known as a Tree-Support, of which the following is a specification.

The object of this device is to adjust the growth of the main branches of a young tree so as to grow to the angle desired, and especially with a view to making the tree grow in a vase shape and have an open center, in the case of certain variety of trees, and to prevent the main branches from drooping or dragging on the ground in the case of other varieties that tend to grow in that manner.

Figure 1 represents a plan view, and Fig. 2 represents an elevation of the device.

The entire device consists of six parts numbered 1 to 6 inclusive on the drawing attached hereto.

1 is the hub to which is attached five spokes or rods 2 and which in turn are attached to a corrugated hoop marked 6.

4 is a sleeve attached to the hub 1 and 3 is a thumb screw passing through the side of sleeve 4.

5 is a rod or pipe which is inserted in the sleeve 4 and to which the wheel may be adjusted at any point by screwing tight the thumb screw 3. The spaces on the circumference of the hub 1 between the points where the spokes are fastened to it may be hollowed out as shown at letter *o* on Fig. 1.

The corrugated hoop 6 is made of heavy wire and the spokes 2 are made of light wire to hold the hoop firmly in place. The hub 1, the sleeve 4, and the thumb screw 3 are made of wrought iron. The rod 5 may be either a wrought iron bar or a piece of pipe.

In operating the device, the rod 5 is driven into the ground next to the trunk of the young tree and the trunk securely tied to it. The wheel is then slipped over the rod 5 through the sleeve 4 and adjusted to such a height as may be desired and securely fastened in place by screwing tight the thumb screw 3. The young branches which are intended to form the main trunk branches of the tree are then placed in the corrugations at such points in the hoop as desired and fastened to the hoop with strings to hold them in place. The device is then permitted to remain in place during the growing season until the branches have grown to such a size and adjusted themselves to angle in which place about the device, and then the device is removed. The hoop 6 may be made any size according to the variety and age of the trees desired to be adjusted. If it is desired to make an open center of a variety tree that tends to grow in a very perpendicular manner, the wheel is adjusted on the rod to such a distance as will force the branches out to the desired angle. If the tree be of a willowy or drooping variety and it is desired to train the main branches to grow in a more upright position, the wheel is raised to such a height as desired and the branches raised up and fastened to the hoop at such an angle of growth as desired and the device permitted to remain there until the branches have grown firmly in the new position.

I claim:—

1. In a tree support a vertically arranged shaft adapted for extending upwardly from the earth to a position among the branches of a tree, a horizontally arranged corrugated circular hoop with spokes reaching from the same to a centrally disposed hub, the hub being secured to said shaft and adjustable thereon, the said corrugated hoop being adapted for engaging the branches of the tree.

2. In a tree support a vertically arranged shaft adapted for extending upwardly from the earth to a position among the branches of a tree, a horizontally arranged corrugated circular hoop with spokes reaching from the same to a centrally disposed hub, said hub being secured to said shaft, the said corrugated hoop being adapted for engaging the branches of the tree.

In testimony whereof, I have hereunto affixed my signature in the presence of two witnesses.

HERMAN THOENI.

Witnesses:
E. W. HAND,
B. G. HUTCHINSON.